United States Patent [19]

Marqua et al.

[11] Patent Number: 4,724,974
[45] Date of Patent: Feb. 16, 1988

[54] DISPENSING CONTAINER FOR DRINKING STRAWS AND THE LIKE

[75] Inventors: Ellen M. Marqua; John T. Marqua, both of Rockford, Ill.

[73] Assignee: Expressions in Wood, Inc., Rockford, Ill.

[21] Appl. No.: 37,584

[22] Filed: Apr. 13, 1987

[51] Int. Cl.⁴ .................. B65D 25/02; B65D 85/08
[52] U.S. Cl. .......................................... 217/64; 217/65; 206/252; 206/443; 220/93; 221/59
[58] Field of Search .................. 206/252, 443, 255; 217/64, 65; 220/93; 221/56, 59

[56] References Cited

U.S. PATENT DOCUMENTS

| 255,458 | 3/1882 | Rockwell | 217/65 |
| 551,692 | 12/1895 | Schmidt | 217/64 |
| 653,514 | 7/1900 | Kasschau | 217/65 X |
| 1,160,322 | 11/1915 | Richards | 217/64 X |
| 4,387,512 | 6/1983 | Gorski et al. | 206/443 |

Primary Examiner—William Price
Attorney, Agent, or Firm—Leydig, Voit & Mayer

[57] ABSTRACT

The dispensing container is a box-like structure made of wood and having an opening at its upper and forward corner to enable drinking straws to be pulled upwardly out of the container. A spring-loaded plunger within the container presses the straws forwardly toward the dispensing opening. The top wall of the container may be slid rearwardly to an open position to enable straws to be loaded into the container and, to facilitate such loading, the plunger is adapted to be latched releasably in a rearwardly retracted position by a pin and groove latching arrangement.

10 Claims, 7 Drawing Figures

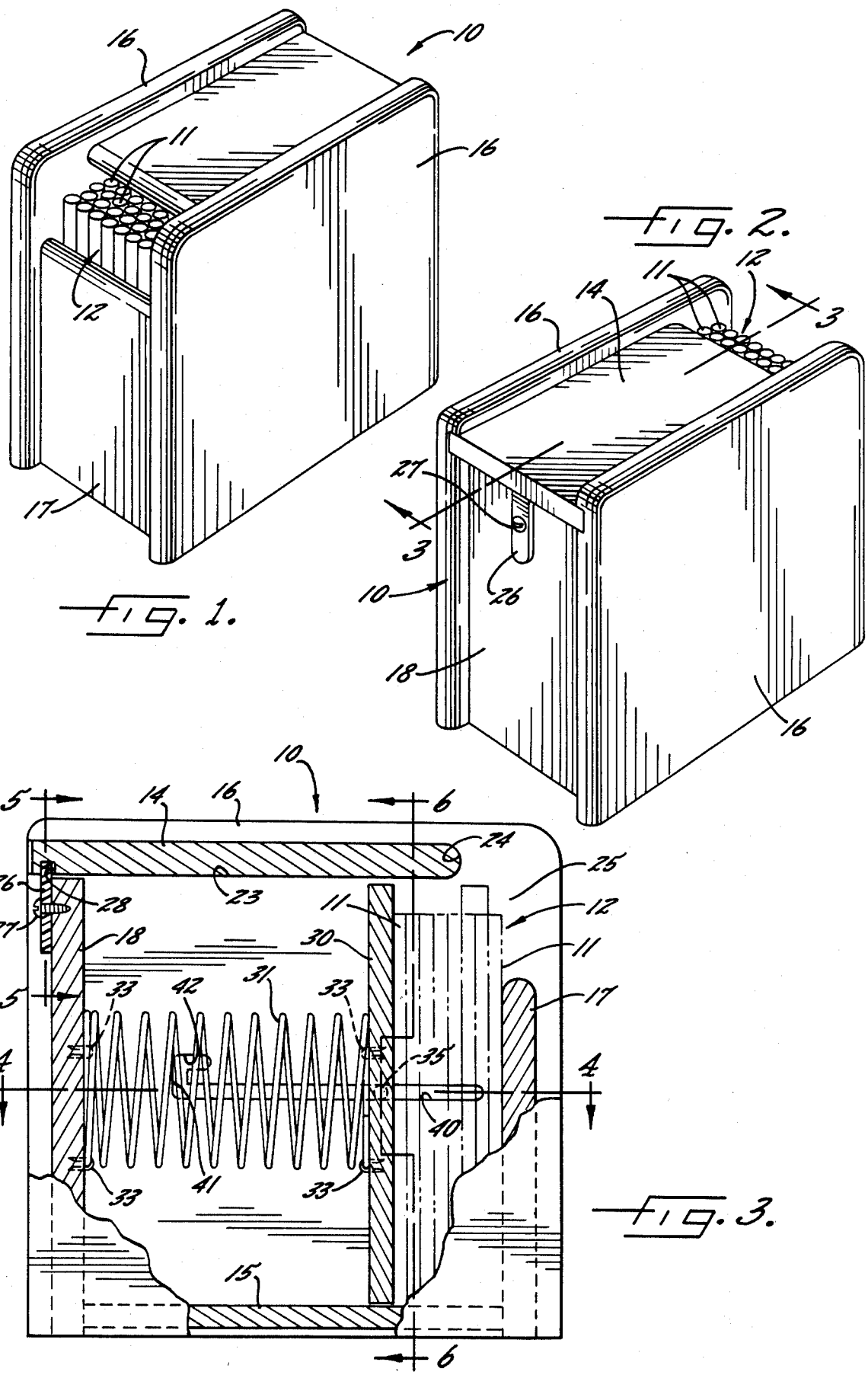

DISPENSING CONTAINER FOR DRINKING STRAWS AND THE LIKE

BACKGROUND OF THE INVENTION

This invention relates generally to a container for holding and facilitating the dispensing of food or beverage accessory items such as paper napkins, drinking straws, swizzle sticks or the like.

More particularly, the invention relates to a container in the form of a box-like structure adapted to hold a bundle of the accessory items in an upright position. A spring-loaded plunger is located in the container and engages the rear side of the bundle to force the items forwardly against the front wall of the container. Each time a consumer removes one or more items from a dispensing opening at the front of the container, the remaining items in the bundle are shifted forwardly by the plunger so as to keep a supply of items readily available at the dispensing opening.

SUMMARY OF THE INVENTION

The general aim of the present invention is to provide a new and improved dispensing container of the above general type which lends itself to being made of attractive wood and which may be more easily and quickly loaded with a bundle of items than has been possible with prior containers used for the same general purpose.

A more detailed object of the invention is to achieve the foregoing by providing a container with side walls which preferably are made of wood and which are uniquely grooved to enable the spring-loaded plunger to be latched positively but releasably in a retracted position when a bundle of items is loaded into the container.

Still another object is to provide a container made of wood and having a cover which may be slid rearwardly to an open position to facilitate latching of the plunger and to facilitate loading of the items into the container.

The invention also resides in the provision of a relatively simple and inexpensive latch for releasably holding the cover of the container in a closed position.

These and other objects and advantages of the invention will become more apparent from the following detailed description when taken in conjunction with the accompanying drawings.

BRIEF DESCRIPTION OF THE DRAWINGS

FIG. 1 is a front perspective view of a new and improved container embodying the unique features of the present invention.

FIG. 2 is a rear perspective view of the container.

FIG. 3 is an enlarged cross-section taken substantially along the line 3—3 of FIG. 2.

DETAILED DESCRIPTION OF THE PREFERRED EMBODIMENT

Figure 4:
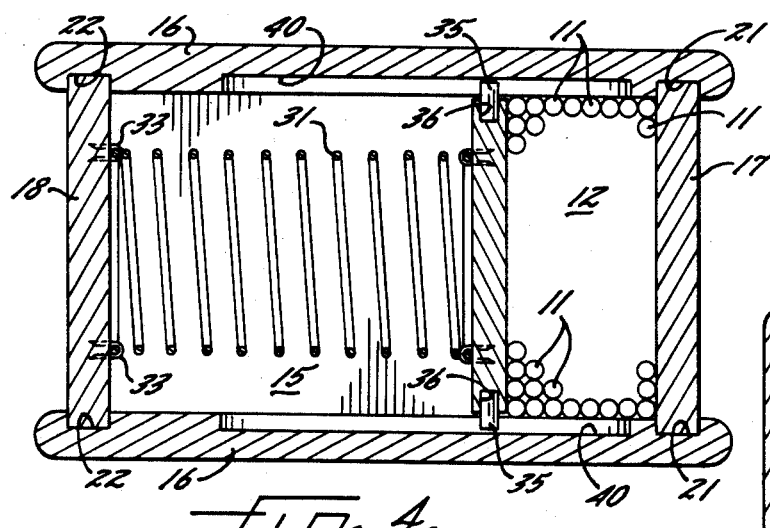
FIG. 4 is a cross-section taken substantially along the line 4—4 of FIG. 3.

For purposes of illustration, the invention has been shown in the drawings as embodied in a container 10 for holding and facilitating the dispensing of food or beverage accessory items 11. While the items could be paper napkins, toothpicks, swizzle sticks or the like, the particular items which have been illustrated are paper-wrapped drinking straws made of plastic. The container 10 is adapted to hold a bundle 12 of upright straws 11 and is particularly adapted for use on the counter of a fast food facility to enable a consumer to obtain one or more straws on a self-serve basis.

The present invention contemplates the provision of a new and improved dispensing container 10 which is particularly designed to be made of attractive and aesthetically pleasing wood such as oak. The container is particularly characterized by its ability to be easily loaded with a bundle 12 of straws 11 while being capable of forcing the straws forwardly to a position in which the straws may be easily removed from the container by the consumer.

More specifically, the container 10 is a box-like structure having vertically spaced and generally horizontal top and bottom walls 14 and 15, a pair of laterally spaced upright side walls 16, and longitudinally spaced upright front and rear walls 17 and 18. While the various walls could be made of plastic or composition board, they are, for purposes of presenting a rich appearance, preferably made of solid oak or other fine wood.

The two side walls 16 are of equal height and, on their inboard faces and adjacent their bottom margins, are formed with longitudinally extending and horizontal grooves 20 (FIG. 6) which receive the longitudinally extending side margins of the bottom wall 15 with a snug fit. Vertical grooves 21 (FIG. 4) are formed in the inboard faces of the side walls 16 adjacent the forward ends thereof and tightly receive the vertically extending side margins of the front wall 17. Similarly, the vertical side margins of the rear wall 18 are received with a tight fit in vertically extending grooves 22 formed in the inboard faces of the side walls 16 adjacent the rear ends of such walls. The walls 15, 17 and 18 are cemented within the grooves 20, 21 and 22, respectively, so as to rigidly hold the various walls together as a unit.

Figure 6:
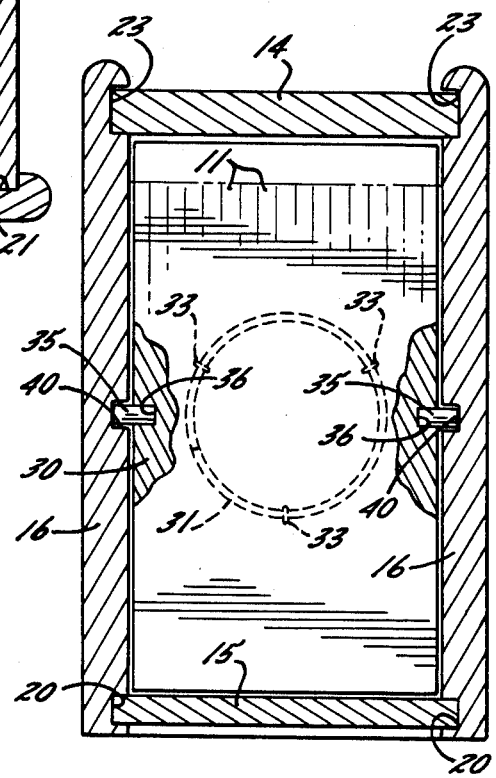
FIG. 6 is a cross-section taken substantially along the line 6—6 of FIG. 3.

As shown in FIGS. 3 and 6, the side margins of the top wall 14 are received in a pair of longitudinally extending and horizontal grooves 23 formed in the inboard faces of the side walls 16 adjacent the upper edges thereof. Pursuant to the invention, the top wall 14 is slidable in the grooves 23 between open and closed positions. When the top wall is in its open position, it uncovers most or all of the top of the container 10 so as to enable a new bundle 12 of straws 11 to be placed downwardly into the container. When the top wall is in its fully closed position, it covers most of the straws in the bundle so as to protect the straws and also to discourage a consumer from taking an unnecessarily large quantity of straws out of the top of the container.

The forward ends of the grooves 23 are closed as indicated at 24 in FIG. 3 and define stops to prevent the top wall 14 from being slid forwardly beyond the fully closed position shown in FIGS. 1 and 3. When the top wall 14 is fully closed, its forward end terminates short of the front wall 17. In addition, the front wall 17 is substantially shorter than the rear wall 18 and its upper end is spaced a significant distance below the plane of the underside of the top wall 14. As a result of this arrangement between the top and front walls 14 and 17, a dispensing opening 25 for the straws 11 is defined at the upper and forward corner of the container 10. Thus, a consumer may reach into the dispensing opening 25 and gain access to a limited number of straws 11.

Figure 5:
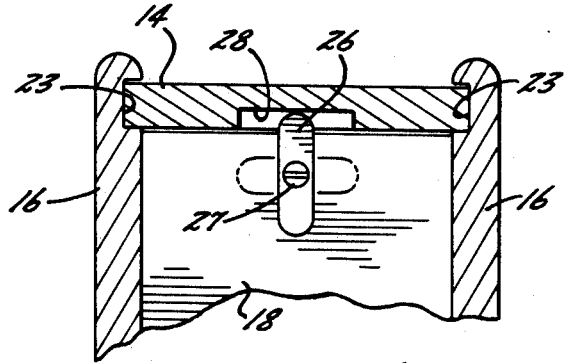
FIG. 5 is a fragmentary cross-section taken substantially along the line 5—5 of FIG. 3.
Figure 7:
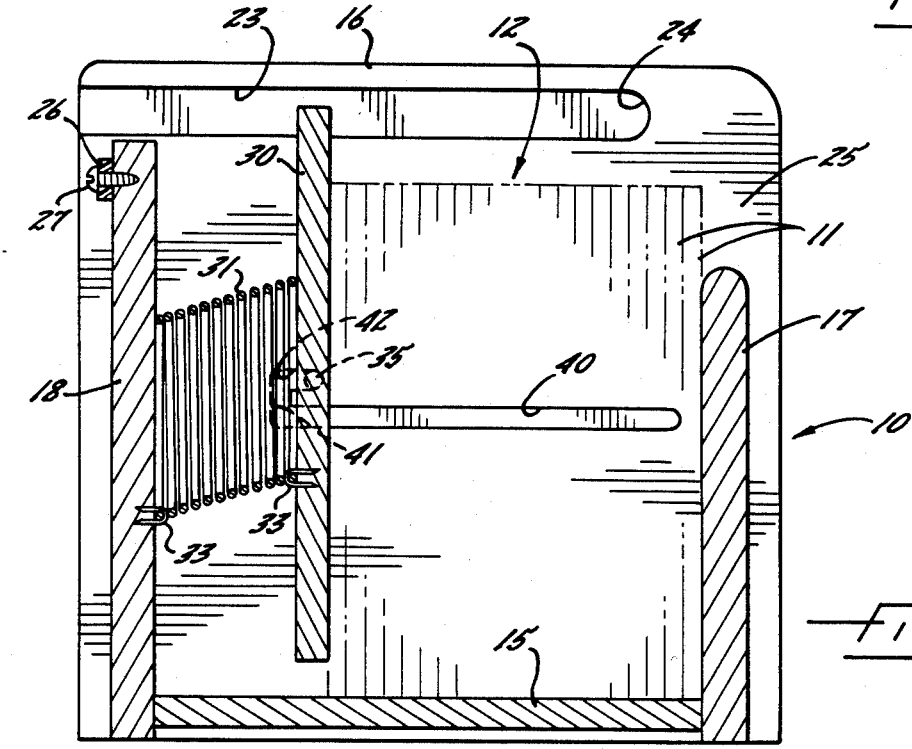
FIG. 7 is a cross-sectional view similar to FIG. 3 but shows the cover of the container removed and the plunger of the container latched in a retracted position.

Means are provided for releasably latching the top wall 14 in its fully closed position. Herein, these means comprise a latching finger 26 (FIGS. 3 and 5) formed by a flat sheet metal plate which is supported on the rear side of the rear wall 18 to pivot between latched and unlatched positions about a horizontal axis defined by a screw 27. The screw attaches the latching finger 26 to the rear wall but is left sufficiently loose to permit the finger to be turned manually. When the finger is in its latched position, it seats in a downwardly opening notch 28 (FIG. 5) formed in the lower face of the top wall 14 just short of the rear end thereof. The finger thus coacts with the notch to restrict rearward movement of the top wall. When the finger is pivoted to an unlatched and substantially horizontal position as shown in FIG. 7, the top wall may be slid rearwardly in the grooves 23 to open the container 10 and, if desired, may be pulled completely off of the container. The grooves 23 open rearwardly out of the rear ends of the side walls 16 as shown in FIG. 2 so as to permit rearwardly sliding of the top wall 14.

To keep the straws 11 located adjacent the front of the container 10 and near the dispensing opening 25, a plunger 30 (FIGS. 3 and 4) is located in the container and presses against the rear side of the bundle 12 to push the bundle forwardly against the front wall 17. In the present instance, the plunger is a plate-like member which preferably is made of pressed fiber board. The plunger is rectangular in shape and has a height and width just slightly smaller than the height and width, respectively, of the closed container.

A coil spring 31 is compressed between the front side of the rear wall 18 and the rear side of the plunger 30 and biases the plunger forwardly so as to cause the plunger to press the straws 11 against the front wall 17. As straws are removed from the container 10, the plunger shifts the bundle forwardly so as to keep a supply of straws near the area of the dispensing opening 25. The spring is secured to the rear wall 18 and the plunger 30 by U-shaped staples or brads 33 (FIGS. 3 and 4) which straddle the end coils of the spring.

In keeping with the invention, unique means are provided for releasably latching the plunger 30 in a rearwardly retracted position adjacent the rear wall 18 of the container 10. By virtue of latching the plunger, the container may be loaded with a new supply of straws 11 without interference from the plunger and without need of manually holding the plunger in a retracted position.

Herein, the latching means comprise a pair of guides or pins 35 (FIGS. 4 and 6) which project laterally from the side edges of the plunger 30 about midway along the height thereof. The pins preferably are short, cylindrical dowels which are telescoped with a tight press fit into holes 36 formed in the vertical side edges of the plunger.

During normal use of the container 10, the pins 35 are received in longitudinally extending and generally horizontal grooves 40 (FIG. 3). The grooves are formed in the inboard faces of the side walls 16 about midway between the upper and lower edges of the side walls. Each groove 40 has a closed end located near the front wall 17 and extends a substantial distance along the side wall 16. As the plunger 30 is shifted forwardly by the spring 31, the pins 35 ride within and are guided by the grooves 40 and help hold the plunger in a stable and upright position.

Communicating with and extending upwardly from the rear end of each horizontal groove 40 is a short vertically extending groove section 41 (FIGS. 3 and 7) which is formed in the inboard face of the respective side wall 16. A horizontal groove section 42 also is formed in each side wall above the groove 40 and extends forwardly from the upper end of the vertical groove 41. Each horizontal groove 42 is relatively short in length and terminates in a closed forward end.

When the container 10 is to be loaded with straws 11, the top wall 14 is unlatched and is slid rearwardly to an open position or, optionally, is completely removed from the container (see FIG. 7). Thereafter, the plunger 30 is pushed rearwardly until the pins 35 stop against the closed rear ends of the long grooves 40. The plunger then is lifted slightly (as permitted by the open top wall) to cause the pins to move upwardly into the vertical groove sections 41. Thereafter, the plunger either is manually moved forwardly or is released to the action of the spring 31 to cause the pins to shift into the horizontal groove sections 42 and bottom against the closed forward ends thereof as shown in FIG. 7. As a result, the plunger is positively held against forward movement so as to free both of the person's hands to load a bundle 12 of straws 11 into the container without interference from the plunger. After the container has been filled, the plunger is shifted rearwardly and then downwardly to return the pins 35 to the grooves 40 and thereby enable the plunger to push the straws forwardly.

We claim:

1. A container for holding and facilitating the dispensing of food or beverage accessory items such as drinking straws or the like, said container comprising a box-like structure for holding a bundle of said items, said box-like structure having vertically spaced and generally horizontal top and bottom walls, having laterally spaced upright side walls and having longitudinally spaced upright front and rear walls, said top wall having a forward end which terminates short of the upper end of said front wall thereby to define a dispensing opening for said items at the upper and forward corner of said box-like structure, a plunger located in said box-like structure and adapted to engage the rear side of a bundle of items in said structure, a spring acting between said rear wall and said plunger and serving to press said plunger forwardly against said bundle and thereby cause said plunger to push said bundle forwardly toward said front wall so as to enable removal of said items from said structure by way of said dispensing opening, guides projecting laterally from the sides of said plunger, longitudinally extending grooves in said side walls and slidably receiving said guides to stabilize said plunger as the latter is pressed forwardly by said spring, and means adjacent the rear end of each groove for releasably locking said plunger in a retracted position adjacent said rear wall and against the action of said spring when items are loaded into said structure, said means comprising a first groove section communicating with and extending vertically from each longitudinally extending groove and further comprising a second groove section communicating with and extending forwardly from said first groove section, each of said second groove sections having a closed forward end, said first and second groove sections being sized to slidably receive said guides whereby said plunger may be shifted rearwardly and then vertically to cause said guides to enter said first groove sections and then may be permitted to move forwardly to cause said guides to enter said second groove sections and stop against the closed forward ends thereof.

2. A container as defined in claim 1 further including means for mounting said top wall for movement between open and closed positions, said top wall uncovering substantially the entire top of said structure when in said open position thereby to enable a bundle of said items to be loaded downwardly into said structure.

3. A container as defined in claim 2 in which said mounting means comprise horizontally extending grooves formed in the inboard sides of said side walls adjacent the upper ends thereof, said horizontally extending grooves opening rearwardly out of said side walls and slidably receiving the longitudinally extending side margins of said top wall.

4. A container for holding and facilitating the dispensing of drinking straws, said container comprising a box-like structure having vertically spaced and generally horizontal top and bottom walls made of wood, having laterally spaced upright side walls made of wood and having longitudinally spaced upright front and rear walls made of wood, horizontally extending grooves formed in the inboard sides of said side walls adjacent the upper ends thereof, said grooves opening rearwardly out of said side walls and slidably receiving the longitudinally extending side margins of said top wall to support said top wall for back and forth movement between open and closed positions, said top wall having a forward end which terminates short of said front wall when said top wall is in said closed position thereby to define a dispensing opening for said straws at the upper and forward corner of said box-like structure, said top wall uncovering substantially the entire top of said structure when said top wall is in said open position thereby to enable a bundle of straws to be loaded downwardly into said structure, an upright plate-like plunger located in said structure and adapted to engage the rear side of a bundle of straws in said structure, a coil spring compressed between said rear wall and said plunger and acting to press said plunger forwardly against said bundle and thereby cause said plunger to push said bundle forwardly against said front wall so as to enable removal of said straws from said structure by way of said dispensing opening, horizontal pins projecting laterally from the sides of said plunger, longitudinally extending grooves in the inboard sides of said side walls below said horizontally extending grooves and slidably receiving said pins to stabilize said plunger as the latter is pushed forwardly by said spring, and means adjacent the rear end of each longitudinally extending groove for releasably locking said plunger in a retracted position adjacent said rear wall and against the action of said spring when straws are loaded into said structure, said means comprising a first groove section communicating with and extending vertically from each longitudinally extending groove and further comprising a second groove section communicating with and extending forwardly from said first groove section, each of said second groove sections having a closed forward end, said first and second groove sections being sized to slidably receive said pins whereby said plunger may be shifted rearwardly and then vertically to cause said pins to enter said first groove sections and then may be permitted to spring forwardly to cause said pins to enter said second groove sections and stop against the closed forward ends thereof.

5. A container as defined in claim 4 in which holes are formed in the laterally facing sides of said plunger, said pins comprising dowels telescoped into said holes.

6. A container as defined in claim 4 in which each first groove section extends upwardly from the rear end portion of the respective longitudinally extending groove whereby said plunger is shifted upwardly to cause said pins to enter said first groove sections.

7. A container as defined in claim 4 in which the upper end of said front wall is spaced a substantial distance below the plane of the lower side of said top wall.

8. A container as defined in claim 4 further including means for releasably latching said top wall in its closed position.

9. A container as defined in claim 8 in which said latching means comprise a latching finger mounted on the outboard side of said rear wall adjacent the upper end thereof to pivot about a longitudinally extending axis between latched and unlatched positions.

10. A container as defined in claim 9 in which said latching means further comprise a downwardly opening notch formed in the lower side of said top wall just forwardly of the rear end thereof, said notch receiving said latching finger when said top wall is in said closed position and said latching finger is in said latched position.

* * * * *